United States Patent
Hattar

(10) Patent No.: US 10,683,820 B2
(45) Date of Patent: Jun. 16, 2020

(54) METHOD AND SYSTEM FOR REGENERATING A GASOLINE PARTICULATE FILTER IN A VEHICLE PROPULSION SYSTEM

(71) Applicant: GM GLOBAL TECHNOLOGY OPERATIONS LLC, Detroit, MI (US)

(72) Inventor: Rafat F. Hattar, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/884,840

(22) Filed: Jan. 31, 2018

(65) Prior Publication Data

US 2019/0234329 A1    Aug. 1, 2019

(51) Int. Cl.
| | |
|---|---|
| F02D 41/02 | (2006.01) |
| F01N 3/02 | (2006.01) |
| F02D 41/00 | (2006.01) |
| F01N 3/025 | (2006.01) |
| F02D 41/14 | (2006.01) |

(52) U.S. Cl.
CPC ........... *F02D 41/029* (2013.01); *F01N 3/025* (2013.01); *F02D 41/0087* (2013.01); *F02D 41/1466* (2013.01)

(58) Field of Classification Search
CPC ........ F01N 3/025; F01N 3/0237; F01N 3/021; F02D 41/0087; F02D 41/029; F02D 41/025; F02D 41/024; F02D 41/027; F02D 41/123
See application file for complete search history.

(56) References Cited

U.S. PATENT DOCUMENTS

| | | | |
|---|---|---|---|
| 6,023,929 A * | 2/2000 | Ma | F02B 75/22 60/295 |
| 7,197,867 B2 | 4/2007 | Huang et al. | |
| 8,429,899 B2 | 4/2013 | Gonze et al. | |
| 9,506,411 B2 * | 11/2016 | Glugla | F02D 41/0087 |
| 2011/0072783 A1 * | 3/2011 | Hepburn | F01N 3/023 60/274 |
| 2011/0072787 A1 * | 3/2011 | Hubbard | F01N 3/0253 60/276 |
| 2011/0073088 A1 * | 3/2011 | Hubbard | F01N 3/021 123/703 |
| 2011/0265453 A1 * | 11/2011 | Uhrich | F01N 3/0842 60/274 |

(Continued)

*Primary Examiner* — Phutthiwat Wongwian
*Assistant Examiner* — Diem T Tran

(57) ABSTRACT

A vehicle propulsion system includes an internal combustion engine with a first combustion chamber and a second combustion chamber, a catalytic converter in an exhaust stream in communication with an exhaust of the internal combustion engine, a gasoline particulate filter in the exhaust stream downstream of the catalytic converter, and a controller in communication with the internal combustion engine. The controller is programmed to determine if a soot loading of the gasoline particulate filter exceeds a predetermined threshold, and adjust a set of engine operating parameters of the internal combustion engine to disable combustion in the first combustion chamber and enrich a fuel mixture in the second combustion chamber if the soot loading in the gasoline particulate filter exceeds the predetermined threshold.

6 Claims, 2 Drawing Sheets

(56) References Cited

U.S. PATENT DOCUMENTS

| | | | | |
|---|---|---|---|---|
| 2014/0041362 A1* | 2/2014 | Ulrey | ............... | F02D 41/0087 |
| | | | | 60/274 |
| 2014/0331667 A1* | 11/2014 | Kindl | ............... | F02M 26/43 |
| | | | | 60/602 |
| 2016/0201532 A1* | 7/2016 | Chanko | ............... | F01N 3/0232 |
| | | | | 60/274 |

* cited by examiner

METHOD AND SYSTEM FOR REGENERATING A GASOLINE PARTICULATE FILTER IN A VEHICLE PROPULSION SYSTEM

FIELD

The present disclosure relates to a method and system for regenerating a gasoline particulate filter in a vehicle propulsion system.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Increasingly stringent emissions standards continue to present challenges for automobile and motor vehicle engineers and designers throughout the world. While port fuel injected (PFI) gasoline engines can generally meet these standards, the industry is increasingly moving to gasoline direct injected (GDI) engines for which such limits represent a significant challenge.

One of the currently accepted solutions to bringing gasoline direct injected engines into conformance with these new standards envisions the use of a gasoline particulate filter (GPF). As the name suggests, in its most basic configuration, a gasoline particulate filter is simply a filter disposed in the exhaust system of the gasoline fueled engine in which particulate matter is trapped and accumulates. Because any such particulate filter will be of finite size and thus capable of collecting and retaining only a finite amount of particulate matter from the exhaust of the internal combustion engine, the question rather quickly arises of how the filter is purged or regenerated.

In order to regenerate, the GPF must reach a high enough temperature and there must be a sufficient supply of oxygen to permit the reaction of oxidation to occur. Further, to maintain the oxidation reaction the temperature and the supply of oxygen must be maintained. It has been a challenge to sufficiently maintain a high enough temperature and to maintain a sufficient supply of oxygen.

SUMMARY

In an exemplary aspect, a vehicle propulsion system includes an internal combustion engine with a first combustion chamber and a second combustion chamber, a catalytic converter in an exhaust stream in communication with an exhaust of the internal combustion engine, a gasoline particulate filter in the exhaust stream downstream of the catalytic converter, and a controller in communication with the internal combustion engine. The controller is programmed to determine if a soot loading of the gasoline particulate filter exceeds a predetermined threshold, and adjust a set of engine operating parameters of the internal combustion engine to disable combustion in the first combustion chamber and enrich a fuel mixture in the second combustion chamber if the soot loading in the gasoline particulate filter exceeds the predetermined threshold.

In another exemplary embodiment, the controller is further programmed to alternate between adjusting a set of engine operating parameters of the internal combustion engine to disable combustion in the first combustion chamber and enrich a fuel mixture in the second combustion chamber, and adjusting a set of engine operating parameters of the internal combustion engine to disable combustion in the second combustion chamber and enrich a fuel mixture in the first combustion chamber.

In another exemplary embodiment, the internal combustion engine includes a plurality of combustion chambers numbering at least three combustion chambers and wherein the second combustion chamber corresponds to at least two of the plurality of combustion chambers.

In another exemplary embodiment, the controller is further programmed to adjust the set of engine parameters such that the first combustion chamber rotates among the plurality of combustion chambers.

In another exemplary embodiment, the controller is further programmed to determine a volume of flow through the first combustion chamber, determine if the volume of flow through the first combustion chamber exceeds a predetermined threshold, and rotate the first combustion chamber among the plurality of combustion chambers if the volume of flow through the first combustion chamber exceeds the predetermined threshold.

In another exemplary embodiment, the controller is further programmed to determine a temperature of the first combustion chamber, determine if the temperature of the first combustion chamber drops below a predetermined minimum, and rotate the first combustion chamber among the plurality of combustion chambers if the temperature of the first combustion chamber drops below the predetermined minimum.

In another exemplary embodiment, the gasoline particulate filter is a coated gasoline particulate filter.

In this manner, regeneration of a gasoline particulate filter may be improved by simultaneously enabling an increase in exhaust temperature and improving a supply of oxygen to the gasoline particulate filter. This obviates any necessity for leaning the fuel mixture during combustion and, instead, enables an enriching of the fuel mixture which promotes combustion stability. Further, disabling combustion in a chamber provides a significantly improved source for oxygen which not only improves the oxidation reaction during regeneration of the gasoline particulate filter but also may provide for an oxygen saturated catalyst reaction which may improve the heat generated by the catalyst which, in turn, may improve the regeneration of the gasoline particulate filter.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
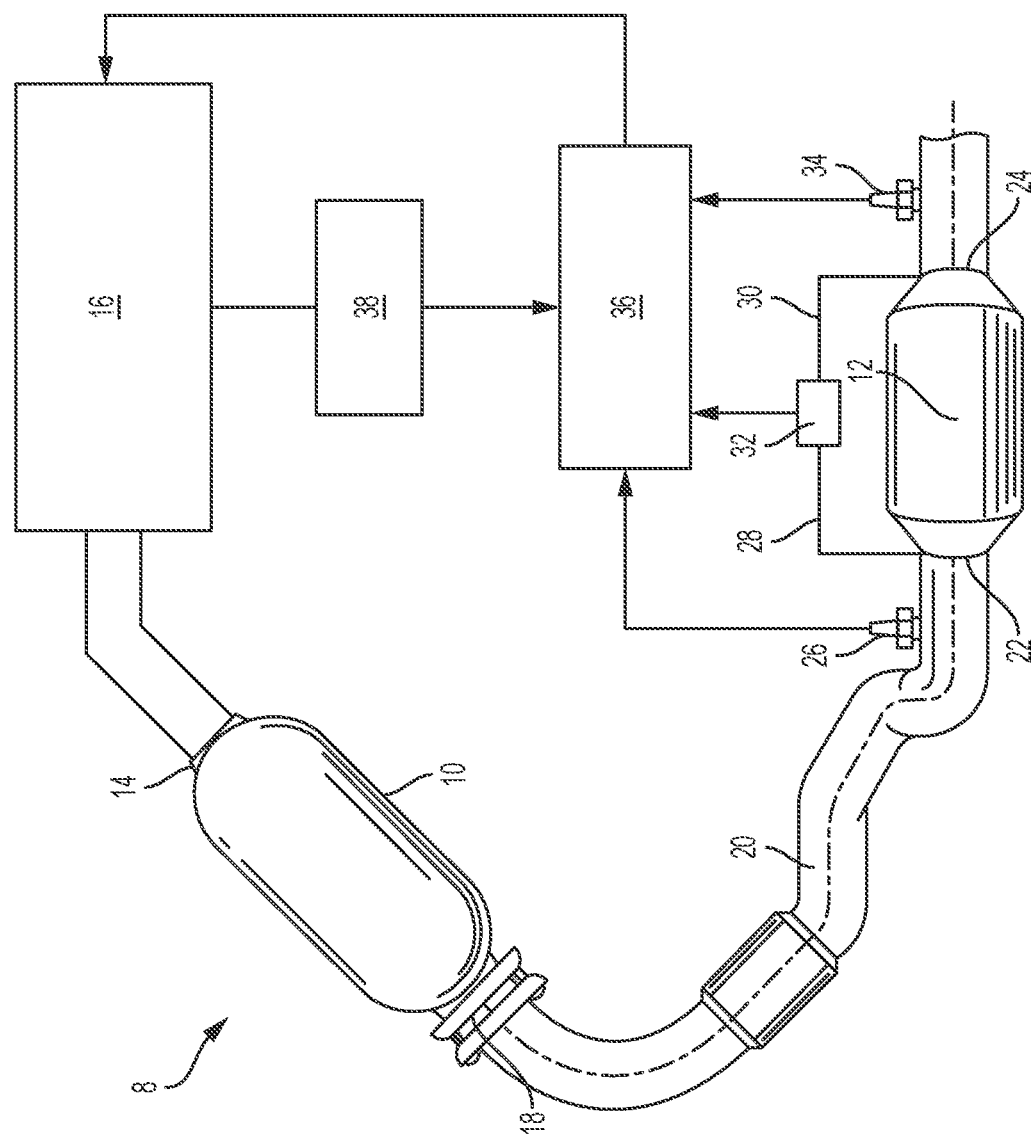
FIG. 1 is a schematic illustration of an exemplary vehicle propulsion system in accordance with the present disclosure.

With reference to FIG. 1A, a first, under-floor system configuration 8 of a three way catalytic converter (TWC) 10 and separate gas particulate filter (GPF) 12 is illustrated. The three way catalytic converter 10, which is conventional, includes an inlet end or opening 14 which receives exhaust gases from a gasoline fueled internal combustion engine 16 and an outlet end or opening 18 which is connected through an exhaust pipe 20 to an inlet end or opening 22 of the gas particulate filter 12. In turn, the gas particulate filter 12 has an outlet end or opening 24 which feeds the output of the particulate filter 12 to other components of the exhaust system such as mufflers, resonators and tail pipes (all not illustrated).

Upstream or ahead of the gas particulate filter 12 and disposed in the exhaust pipe 20 is a pre-GPF temperature sensor 26 which, as the name suggests, measures the temperature of the exhaust gases entering the gas particulate filter 12. Disposed across the gas particulate filter 12, that is, with a first pressure sensing pipe or tube 28 connected to or adjacent the inlet end or opening 22 of the gas particulate filter 12 and a second pressure sensing pipe or tube 30 connected to or adjacent the outlet end or opening 24 of the gas particulate filter 12, is a differential pressure sensor 32 which senses the pressure drop of the exhaust gases across or through the gas particulate filter 12. Downstream or after the gas particulate filter 12 is a post-GPF temperature sensor 34 which, again as the name suggests, measures the temperature of the exhaust gases leaving the gas particulate filter 12. Data or signals from the pre-GPF temperature sensor 26, the differential pressure sensor 32 and the a post-GPF temperature sensor 34 are provided to a gas particulate filter control module 36 which may be a stand-alone electronic device such as a microprocessor with suitable input, memory, processing and output components or may be a portion or component of an engine control module (ECM) (not illustrated). Other data and signals from sensors 38, for example, a vehicle odometer, a vehicle speedometer, an engine tachometer, a coolant temperature sensor and an ambient air pressure sensor are or may be supplied to the gas particulate filter control module 36.

In addition to the configuration of a three way catalytic converter (TWC) 10 and separate gas particulate filter (GPF) 12 of FIG. 1 this disclosure may also relate to a close coupled converter and filter assembly 40 of FIG. 1B, and/or a coated GPF, which is also referred to as a four way catalytic converter or device. This device includes a three way catalytic converter and its function combined and integral with a gas particulate filter.

As explained above, the GPF has a finite capacity for particulate matter and at some point the GPF must be regenerated to renew the capacity. In order to regenerate, the GPF must reach a high enough temperature and there must be a sufficient supply of oxygen to permit the reaction of oxidation to occur. Further, to maintain the oxidation reaction the temperature and the supply of oxygen must be maintained. It has been a challenge to sufficiently maintain a high enough temperature and to maintain a sufficient supply of oxygen.

U.S. patent application Ser. No. 15/689,471, the disclosure of which is incorporated herein in its entirety, discloses a method for regenerating a GPF which is triggered when the temperature of the GPF has reached a burn off temperature. Once the method determines that a burn off temperature has been achieved, then a soot burning phase is initiated in which the amount of fuel that is supplied for combustion is reduced, in other words, the combustion is "leaned" (i.e. the amount of fuel supplied for combustion is reduced). As a result of leaning the fuel mixture, the efficiency of combustion decreases, which in turn means, that the oxygen that is supplied for combustion is not entirely consumed during combustion. As a result, a supply of oxygen becomes available (or the supply of oxygen is increased) in the exhaust stream. The supply of oxygen in the exhaust stream may enable the oxidation reaction (i.e. the regeneration) in the GPF. One of the limitations of this method is that there is only a certain amount of leaning which is possible before the combustion becomes unstable. Therefore, there is an inherent limitation on the amount of oxygen that may be provided to the GPF by leaning the fuel mixture for combustion. The operating range for stable combustion when leaning out the mixture is extremely narrow. For example, the limitation for leaning the fuel mixture may be between about 10-15% lean which only increase the oxygen in the exhaust stream to a limited amount. By the time that exhaust stream exits a catalytic converter, there may be very little if any oxygen available to regenerate the GPF.

Additionally, there may be other devices in the exhaust stream upstream of the GPF that may also consume oxygen which only further reduces the limited amount of oxygen that is available for the oxidation reaction in the GPF to regenerate the GPF. As illustrated by the exemplary embodiment of FIG. 1, a three way catalytic converter 10 is positioned upstream of the GPF 12. The reactions that occur in the catalytic converter 10 may consume a portion of the limited supply of oxygen and therefore further reduces the amount of oxygen available for the GPF regeneration.

In an exemplary embodiment of the present disclosure, in order to trigger, control, and improve regeneration of the GPF combustion at least one of the combustion chambers in the engine is disabled or deactivated while the fuel mixture for at least one of the other combustion chambers in the engine is enriched. In this manner, the present disclosure provides the ability to simultaneously control and increase the temperature of the GPF while also providing sufficient oxygen to maintain an oxidation reaction in the GPF for regenerating the GPF. In contrast, to the conventional regeneration techniques, by disabling a combustion chamber a much greater supply of oxygen may be provided to the exhaust stream in comparison to conventional techniques of leaning the fuel mixture.

Further, the increase in oxygen in the exhaust stream enables a reaction in a catalytic converter which, in turn, may increase and controllably maintain the temperature of the exhaust stream at a temperature which enables oxidation in the GPF. Even with this additional oxidation reaction in the converter, by disabling one of the combustion chambers, enough residual oxygen flows through the converter to enable the GPF for the oxidation regeneration reaction. In this manner, the exhaust temperature is maintained and/or increased to a high enough temperature for regeneration to occur while simultaneously providing enough additional oxygen for the regeneration process in the GPF.

Further, in order to have residual oxygen for the GPF, the catalytic converter should be oxygen saturated. By disabling a cylinder, the invention of the present disclosure enables enough additional oxygen to be provided in in the exhaust stream to cause oxygen saturation in the converter. Saturating the converter means that we are able to gain the most possible heat from the converter, which further improves and increases the heat provided for the GPF regeneration in comparison with conventional methods.

In addition to increasing the amount of oxygen supplied to the exhaust stream, disabling combustion in one of the combustion chambers enables the fuel mixture supplied to other combustion chambers to be enriched which drastically improves the stability of combustion in comparison with regeneration techniques which rely upon leaning the fuel mixture. In general, combustion with a richer fuel mixture is more tolerant of combustion condition variations than that of a lean fuel mixture.

Simultaneously, enriching the fuel mixture in a combustion chamber while increasing the supply of oxygen by disabling another combustion chamber enables a reaction in the catalytic converter which increases the temperature of the exhaust stream. In this manner, the temperature in the exhaust stream at the GPF and the supply of oxygen to the GPF may be simultaneously enabled.

In an exemplary embodiment of the present disclosure, the cylinder deactivation strategy rotates the cylinders. When a cylinder is deactivated, the temperature of the combustion chamber may decrease because the source of heat (i.e. combustion) has been removed. This cooling may result in an undesirable cooling of the exhaust stream and/or adversely affect the combustion in that chamber when the cylinder is no longer deactivated. To avoid too much cooling, different approaches may be taken. For example, the volume flowing through the deactivated cylinder may be monitored or estimated and when that volume reaches a predetermined volume, then that cylinder may be re-activated and another cylinder may be deactivated. Alternatively, a piston temperature model may be employed and the cylinder may be re-activated and another cylinder may be deactivated if the model indicates that the piston temperature has dropped below a threshold minimum.

In yet another exemplary embodiment, the GPF may be a type which has been coated with catalytic materials. This is generally referred to as a "coated GPF". With the method and system of the present invention, a coated GPF may gain from yet another benefit in which the catalytic reaction in the coated GPF further increases the heat in the exhaust stream which, in turn, improves regeneration of the GPF.

Figure 2:
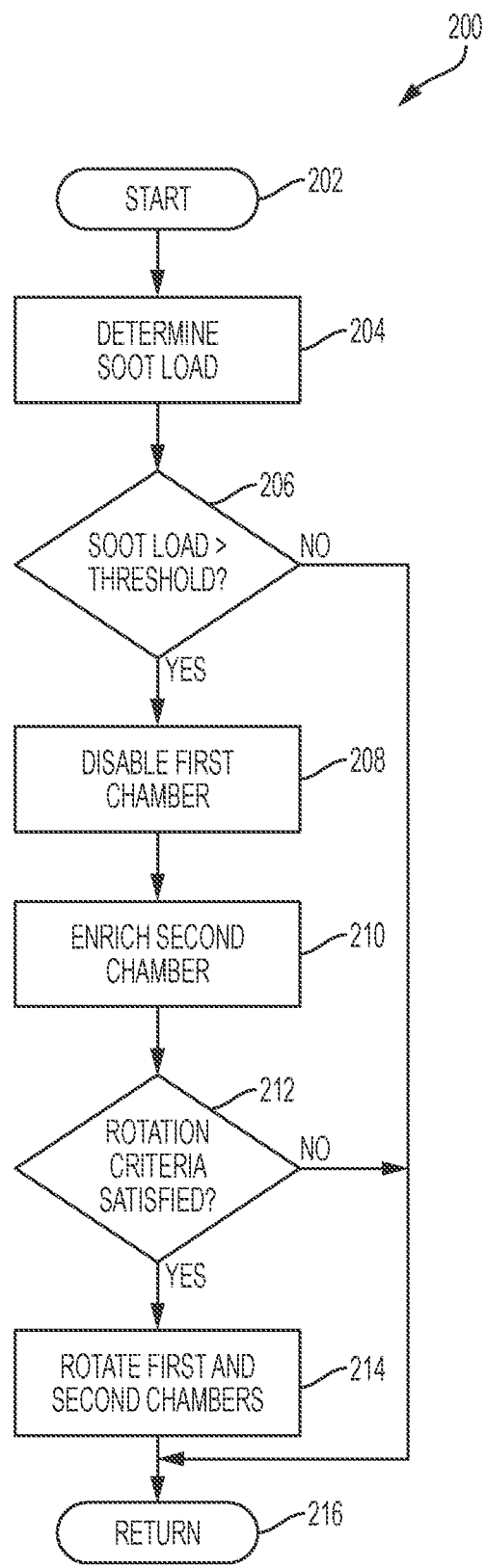
FIG. 2 is a flowchart of an exemplary method in accordance with the present disclosure.

FIG. 2 is a flowchart 200 of an exemplary method in accordance with the present disclosure. The method starts at step 202 and continues to step 204. In step 204, the method determines a soot load of the gasoline particulate filter and continues to step 206. In step 206, the method determines whether the soot load is greater than a predetermined threshold. If, in step 206, the method determines that the soot load is greater than the predetermined threshold then the method continues to step 208. If, however, in step 206, the method determines that the soot load is not greater than a predetermined threshold, then the method continues to step 216. In step 208, the method disables combustion in a first combustion chamber of an internal combustion engine and continues to step 210. In step 210, the method enriches the fuel mixture of a second chamber of the internal combustion engine and continues to step 212. In step 212, the method determines whether a rotation criteria is satisfied. If, in step 212, the method determines that a rotation criteria is satisfied, then the method continues to step 214. If, however, in step 212, the method determines that a rotation criteria is not satisfied, then the method continues to step 216. In step 214, the method rotates the first and second chambers in the internal combustion engine and continues to step 216. In step 216, the method ends or returns.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle propulsion system, the system comprising:
an internal combustion engine with a first combustion chamber and a second combustion chamber;
a catalytic converter in an exhaust stream in communication with an exhaust of the internal combustion engine;
a gasoline particulate filter in the exhaust stream downstream of the catalytic converter; and
a controller in communication with the internal combustion engine and that is programmed to:
determine if a soot loading of the gasoline particulate filter exceeds a predetermined threshold; and
adjust a set of engine operating parameters of the internal combustion engine to disable combustion in the first combustion chamber and enrich a fuel mixture in the second combustion chamber if the soot loading in the gasoline particulate filter exceeds the predetermined threshold, wherein the internal combustion engine includes a plurality of combustion chambers numbering at least three combustion chambers and wherein the second combustion chamber corresponds to at least two of the plurality of combustion chambers, wherein the controller is further programmed to adjust the set of engine parameters such that the first combustion chamber rotates among the plurality of combustion chambers, and wherein
the controller is further programmed to:
determine a volume of flow of gases through the first combustion chamber;
determine if the volume of flow of gases through the first combustion chamber exceeds a predetermined threshold; and
rotate the first combustion chamber among the plurality of combustion chambers if the volume of flow of gases through the first combustion chamber exceeds the predetermined threshold.

2. The system of claim 1, wherein the controller is further programmed to alternate between:
adjusting a set of engine operating parameters of the internal combustion engine to disable combustion in the first combustion chamber and enrich a fuel mixture in the second combustion chamber, and
adjusting a set of engine operating parameters of the internal combustion engine to disable combustion in the second combustion chamber and enrich a fuel mixture in the first combustion chamber.

3. The system of claim 1, wherein the gasoline particulate filter comprises a coated gasoline particulate filter.

4. A method for regenerating a gasoline particular filter in an exhaust stream of an internal combustion engine having a first combustion chamber and a second combustion chamber, a catalytic converter in the exhaust stream upstream of the gasoline particulate filter and in communication with an exhaust of the internal combustion engine, the method comprising:

determining if a soot loading of the gasoline particulate filter exceeds a predetermined threshold;

a controller adjusting a set of engine operating parameters of the internal combustion engine to disable combustion in the first combustion chamber and enriching a fuel mixture in the second combustion chamber if the soot loading in the gasoline particulate filter exceeds the predetermined threshold, wherein the internal combustion engine includes a plurality of combustion chambers numbering at least three combustion chambers and wherein the second combustion chamber corresponds to at least two of the plurality of combustion chambers;

determining a volume of flow of gases through the first combustion chamber;

determining if the volume of flow of gases through the first combustion chamber exceeds a predetermined threshold; and rotating the first combustion chamber among the plurality of combustion chambers if the volume of flow of gases through the first combustion chamber exceeds the predetermined threshold.

5. The method of claim 4, further comprising:

adjusting a set of engine operating parameters of the internal combustion engine to disable combustion in the first combustion chamber and enrich a fuel mixture in the second combustion chamber, and adjusting a set of engine operating parameters of the internal combustion engine to disable combustion in the second combustion chamber and enrich a fuel mixture in the first combustion chamber.

6. The method of claim 4, wherein the gasoline particulate filter comprises a coated gasoline particulate filter.

* * * * *